US008965617B2

(12) United States Patent
Takahara et al.

(10) Patent No.: US 8,965,617 B2
(45) Date of Patent: Feb. 24, 2015

(54) DRIVING SUPPORT SYSTEM, DRIVING SUPPORT METHOD AND COMPUTER PROGRAM

(75) Inventors: Masatoshi Takahara, Anjo (JP); Shogo Sugimoto, Anjo (JP); Kuniaki Tanaka, Toyota (JP); Kiyoshi Tsurumi, Kariya (JP); Yuya Higuchi, Kariya (JP)

(73) Assignees: Aisin AW Co., Ltd., Aichi-ken (JP); Toyota Jidosha Kabushiki Kaisha, Aichi-ken (JP); Denso Corporation, Aichi-ken (JP)

( * ) Notice: Subject to any disclaimer, the term of this patent is extended or adjusted under 35 U.S.C. 154(b) by 0 days.

(21) Appl. No.: 13/978,012

(22) PCT Filed: Feb. 20, 2012

(86) PCT No.: PCT/JP2012/054686
§ 371 (c)(1),
(2), (4) Date: Aug. 26, 2013

(87) PCT Pub. No.: WO2012/132693
PCT Pub. Date: Oct. 4, 2012

(65) Prior Publication Data
US 2013/0338850 A1 Dec. 19, 2013

(30) Foreign Application Priority Data
Mar. 29, 2011 (JP) ................................. 2011-073335

(51) Int. Cl.
G01C 21/26 (2006.01)
G01C 21/36 (2006.01)
G08G 1/056 (2006.01)
G08G 1/16 (2006.01)

(52) U.S. Cl.
CPC ............ *G01C 21/26* (2013.01); *G01C 21/3697* (2013.01); *G08G 1/056* (2013.01); *G08G 1/167* (2013.01)
USPC .......................................................... 701/22

(58) Field of Classification Search
USPC ........................................................... 701/1
See application file for complete search history.

(56) References Cited

U.S. PATENT DOCUMENTS 3,559,756 A * 2/1971 Torres ........................... 180/169
3,876,973 A * 4/1975 Griebel ......................... 340/928
4,320,380 A * 3/1982 Berard et al. ................. 340/935
5,203,422 A * 4/1993 Estep et al. ................... 180/169

(Continued)

FOREIGN PATENT DOCUMENTS

JP 2009-140008 A 6/2009
JP 2009-168547 A 7/2009

(Continued)

*Primary Examiner* — Thomas Tarcza
*Assistant Examiner* — Alex C Dunn
(74) *Attorney, Agent, or Firm* — Sughrue Mion, PLLC

(57) ABSTRACT

Various sensors, such as a GPS and a vehicle speed sensor, are used to detect a current position and direction of a vehicle. A normal running direction, which is a running direction specified for a road on which the vehicle runs, is acquired. In a state where a vehicle speed pulse is acquired at the predetermined intervals, it is detected whether the vehicle is placed in a wrong-way driving situation on the basis of the detected current direction of the vehicle and the normal running direction; whereas, in a state where a vehicle speed pulse is not acquired, it is not detected whether the vehicle is placed in the wrong-way driving situation on the basis of the detected current direction of the vehicle.

7 Claims, 7 Drawing Sheets

(56) References Cited

U.S. PATENT DOCUMENTS

| | | | | |
|---|---|---|---|---|
| 5,225,827 | A * | 7/1993 | Persson | 340/904 |
| 5,359,529 | A * | 10/1994 | Snider | 701/417 |
| 7,869,947 | B2 * | 1/2011 | Schirmer et al. | 701/411 |
| 8,421,648 | B2 * | 4/2013 | Konaka et al. | 340/901 |
| 2005/0171694 | A1 * | 8/2005 | Schirmer et al. | 701/211 |
| 2011/0121992 | A1 * | 5/2011 | Konaka et al. | 340/905 |

FOREIGN PATENT DOCUMENTS

| | | |
|---|---|---|
| JP | 2009-252065 A | 10/2009 |
| JP | 2010-169580 A | 8/2010 |
| JP | 2010-198585 A | 9/2010 |

* cited by examiner

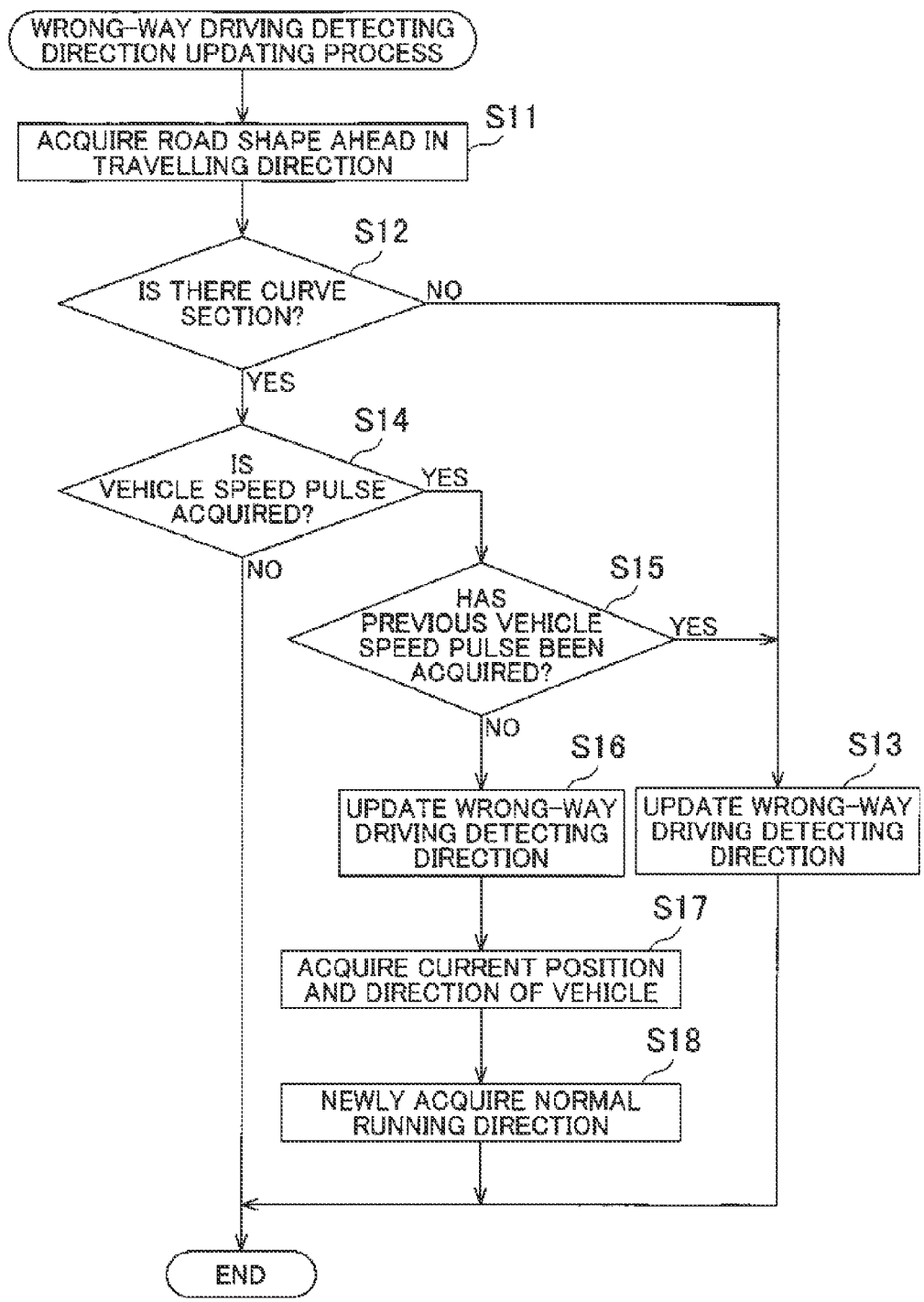

DRIVING SUPPORT SYSTEM, DRIVING SUPPORT METHOD AND COMPUTER PROGRAM

CROSS REFERNCE TO RELATED APPLICATIONS

The application is a National Stage of International Application No. PCT/Jp2012/054686 Filed Feb. 20, 2012, claiming priority based on Japanese Patent Application No. 2011-073335 filed Mar. 29, 2011, the contents of all of which are incorporated herein by reference in their entirety.

TECHNICAL FIELD

The invention relates to a driving support system, a driving support method and a computer program that support vehicle driving.

BACKGROUND ART

In addition to an ordinary road having a narrow road width, in part of roads, on which high-speed running is allowed, such as an automobile expressway, an urban expressway, a freeway, a general toll highway and a national highway, there is a running section in which a road is divided for each running direction, and the running section is configured such that a vehicle runs only in a predetermined direction. However, when a normal running direction specified for a running section is not clearly shown, a vehicle may be driven in a wrong running direction and may be placed in a so-called wrong-way driving situation where the vehicle runs in a direction opposite to the normal running direction. For example, one of causes that a vehicle is placed in a wrong-way driving situation is that, when a vehicle runs on a one-way traffic road formed of a plurality of lanes, a driver erroneously recognizes that a lane other than the running lane on which the vehicle is running (in the case of left-hand traffic, right-side lane) as an oncoming lane and then makes a U-turn. At an interchange of an expressway or the like, a vehicle is placed in a wrong-way driving situation when the vehicle confuses an exit road from the expressway with an entrance road to the expressway, and then the vehicle wrongly enters the exit road from the expressway. In addition, at the time of returning from a parking lot of a service area or a parking area to a main road, a vehicle may be placed in a wrong-way driving situation when the vehicle confuses an exit road from the main road with an entrance road to the main road, and then the vehicle wrongly enters the exit road from the main road.

In an existing art, a technique which is applied to, for example, a navigation system equipped for the vehicle is suggested for detecting that a vehicle is placed in a wrong-way driving situation because of the above described reasons, or the like. For example, Japanese Patent Application Publication No. 2009-140008 (JP-A-2009-140008) describes a technique that identifies a link, on which a vehicle runs, through map matching process and detects that the vehicle is placed in a wrong-way driving situation when the running direction specified for the identified link does not coincide with the travelling direction of the vehicle.

SUMMARY OF THE INVENTION

The current position of a vehicle is detected not only by a GPS but also by dead reckoning that uses a vehicle speed sensor, a gyro sensor, or the like. In the case of detecting the current position of a vehicle by dead reckoning, in a state where a vehicle speed pulse of the vehicle is not acquired for some cause and when the vehicle runs through a curve, there is a possibility that the technique described in JP-A-2009-140008 erroneously detects that the vehicle is placed in a wrong-way driving situation. The reason will be described below.

The case where a vehicle 101 runs through a curved road 102, for which a normal running direction is specified, will be described with reference to FIG. 7A and FIG. 7B by way of example. As shown in FIG. 7B, in the case where the vehicle 101 runs through the road 102, when a vehicle speed pulse is acquired, the detected position of the vehicle (hereinafter, referred to as detected position) does not move from the position at which a vehicle speed pulse is acquired last time. On the other hand, the vehicle direction is changed on the basis of an actual vehicle direction. As a result, although the vehicle 101 is actually running in accordance with the running direction specified for the road 102 as shown in FIG. 7A, it is detected that the vehicle 101 is running in a direction opposite to the running direction specified for the road 102, that is, the vehicle 101 is placed in a wrong-way driving situation.

The invention provides a driving support system, a driving support method and a computer program that are configured to detect whether a vehicle is placed in a wrong-way driving situation in a state where a vehicle speed pulse is acquired at predetermined intervals to thereby suppress erroneous detection that the vehicle is placed in a wrong-way driving situation.

A first aspect of the invention relates to a driving support system. The driving support system includes: a vehicle speed pulse acquisition unit that acquires a vehicle speed pulse that is output at predetermined intervals as a vehicle runs; a vehicle position detecting unit that detects a position of the vehicle on the basis of the vehicle speed pulse acquired by the vehicle speed pulse acquisition unit; a vehicle direction detecting unit that detects a direction of the vehicle; a running direction acquisition unit that acquires a normal running direction, which is a running direction specified for a road on which the vehicle runs, on the basis of the position of the vehicle detected by the vehicle position detecting unit; and a wrong-way driving detecting unit that detects whether the vehicle is placed in a wrong-way driving situation where the vehicle runs a wrong way on the road, on the basis of the direction of the vehicle detected by the vehicle direction detecting unit and the normal running direction, in a state where the vehicle speed pulse is acquired by the vehicle speed pulse acquisition unit at the predetermined intervals.

With the above driving support system, in a state where the vehicle speed pulse is acquired at the predetermined intervals, it is detected whether the vehicle is placed in a wrong-way driving situation on the basis of the detected current direction of the vehicle, so it is possible to suppress erroneous detection that the vehicle is placed in a wrong-way driving situation although the vehicle is actually running in accordance with the running direction specified for the road. As a result, it is possible to further accurately recognize that the vehicle is placed in a wrong-way driving situation. In addition, it is possible to appropriately stop wrong-way driving by notifying or warning the driver, or by controlling the vehicle, for example.

In the above driving support system, the wrong-way driving detecting unit may compare a wrong-way driving detecting direction with the normal running direction to determine whether a difference between the wrong-way driving detecting direction and the normal running direction is larger than or equal to a predetermined angle, and, when the wrong-way driving detecting unit determines that the difference between the wrong-way driving detecting direction and the normal running direction is larger than or equal to the predetermined angle, the wrong-way driving detecting unit may detect that the vehicle is placed in the wrong-way driving situation. In this case, when the vehicle speed pulse is acquired by the vehicle speed pulse acquisition unit at the predetermined intervals, the wrong-way driving detecting unit may update the wrong-way driving detecting direction with the direction of the vehicle detected by the vehicle direction detecting unit; whereas, when the vehicle speed pulse is not acquired by the vehicle speed pulse acquisition unit at the predetermined intervals, the wrong-way driving detecting unit may not update the wrong-way driving detecting direction.

With the above driving support system, only in a state where the vehicle speed pulse is acquired at the predetermined intervals, the running direction specified for the road on which the vehicle runs is compared with the detected current direction of the vehicle to thereby make it possible to further accurately detect whether the vehicle is placed in a wrong-way driving situation where the vehicle runs a wrong way on the road. On the other hand, in a state where the vehicle speed pulse is not acquired because of some cause, even when the difference between the detected current direction of the vehicle and the running direction specified for the road on which the vehicle runs is significantly large, there is no possibility that it is erroneously detected that the vehicle is placed in a wrong-way driving situation. Thus, it is possible to suppress erroneous detection that the vehicle is placed in a wrong-way driving situation.

In the above driving support system, when the current vehicle speed pulse is acquired by the vehicle speed pulse acquisition unit and the previous vehicle speed pulse has not been acquired by the vehicle speed pulse acquisition unit within a predetermined period of time before the current vehicle speed pulse is acquired, the wrong-way driving detecting unit may update the wrong-way driving detecting direction before comparing the wrong-way driving detecting direction with the normal running direction.

With the above driving support system, even when the current vehicle speed pulse is acquired, when the previous vehicle speed pulse is not acquired within the predetermined period of time before the current vehicle speed pulse is acquired, the normal running direction is newly acquired. Thus, it is possible to suppress erroneous detection that the vehicle is placed in a wrong-way driving situation immediately after returning to a state where the vehicle speed pulse is acquired.

The above driving support system may further include a road shape acquisition unit that acquires a road shape of a road ahead of the vehicle in a travelling direction of the vehicle. In this case, when there is no curve section ahead of the vehicle in the travelling direction, the wrong-way driving detecting unit may detect whether the vehicle is placed in the wrong-way driving situation, on the basis of the direction of the vehicle detected by the vehicle direction detecting unit and the normal running direction, irrespective of whether the vehicle speed pulse is acquired by the vehicle speed pulse acquisition unit at the predetermined intervals, and, when there is a curve section ahead of the vehicle in the travelling direction, the wrong-way driving detecting unit may detect whether the vehicle is placed in the wrong-way driving situation, on the basis of the direction of the vehicle detected by the vehicle direction detecting unit and the normal running direction, in a state where the vehicle speed pulse is acquired by the vehicle speed pulse acquisition unit at the predetermined intervals.

With the above driving support system, when there is no curve section ahead of the vehicle in the travelling direction, it is constantly detected whether the vehicle is placed in a wrong-way driving situation on the basis of the detected current direction of the vehicle irrespective of whether the vehicle speed pulse is acquired; whereas, when there is a curve section ahead of the vehicle in the travelling direction, it is detected whether the vehicle is placed in a wrong-way driving situation on the basis of the detected current direction of the vehicle only in a state where the vehicle speed pulse is acquired at the predetermined intervals. Thus, it is possible to appropriately detect a wrong-way driving situation using the current direction of the vehicle, only in a state where there is no possibility that it is erroneously detected that the vehicle is placed in a wrong-way driving situation.

In the above driving support system, the wrong-way driving detecting unit may not detect whether the vehicle is placed in the wrong-way driving situation in a state where the vehicle speed pulse is not acquired by the vehicle speed pulse acquisition unit at the predetermined intervals. Furthermore, in the above driving support system, in a state where the vehicle speed pulse is not acquired by the vehicle speed pulse acquisition unit at the predetermined intervals, the wrong-way driving detecting unit may change a detecting condition for detecting whether the vehicle is placed in the wrong-way driving situation from the detecting condition in a state where the vehicle speed pulse is acquired by the vehicle speed pulse acquisition unit at the predetermined intervals.

With the above driving support systems, it is also possible to suppress erroneous detection that the vehicle is placed in a wrong-way driving situation.

A second aspect of the invention relates to a driving support method. The driving support method includes: acquiring a vehicle speed pulse that is output at predetermined intervals as a vehicle runs; detecting a position of the vehicle on the basis of the acquired vehicle speed pulse; detecting a direction of the vehicle; acquiring a normal running direction, which is a running direction specified for a road on which the vehicle runs, on the basis of the detected position of the vehicle; and detecting whether the vehicle is placed in a wrong-way driving situation where the vehicle runs a wrong way on the road, on the basis of the detected direction of the vehicle and the normal running direction, in a state where the vehicle speed pulse is acquired at the predetermined intervals.

With the above driving support method, in a state where the vehicle speed pulse is acquired at the predetermined intervals, it is detected whether the vehicle is placed in a wrong-way driving situation on the basis of the detected current direction of the vehicle, so it is possible to suppress erroneous detection that the vehicle is placed in a wrong-way driving situation although the vehicle is actually running in accordance with the running direction specified for the road. As a result, it is possible to further accurately recognize that the vehicle is placed in a wrong-way driving situation. In addition, it is possible to appropriately stop wrong-way driving by notifying or warning the driver, or by controlling the vehicle, for example.

A third aspect of the invention relates to a computer program that is installed on a computer and that causes a processor to perform a driving support function. The driving support function includes: acquiring a vehicle speed pulse that is output at predetermined intervals as a vehicle runs; detecting a position of the vehicle on the basis of the acquired vehicle speed pulse; detecting a direction of the vehicle; acquiring a normal running direction, which is a running direction specified for a road on which the vehicle runs, on the basis of the detected position of the vehicle; and detecting whether the vehicle is placed in a wrong-way driving situation where the vehicle runs a wrong way on the road, on the basis of the detected direction of the vehicle and the normal running direction, in a state where the vehicle speed pulse is acquired at the predetermined intervals.

With the above computer program, in a state where the vehicle speed pulse is acquired at the predetermined intervals, it is detected whether the vehicle is placed in a wrong-way driving situation on the basis of the detected current direction of the vehicle, so it is possible to suppress erroneous detection that the vehicle is placed in a wrong-way driving situation although the vehicle is actually running in accordance with the running direction specified for the road. As a result, it is possible to further accurately recognize that the vehicle is placed in a wrong-way driving situation. In addition, it is possible to appropriately stop wrong-way driving by notifying or warning the driver, or by controlling the vehicle, for example.

BRIEF DESCRIPTION OF THE DRAWINGS

The features, advantages, and technical and industrial significance of the invention will be described below with reference to the accompanying drawings, in which like numerals denote like elements, and wherein:

FIG. 4 is a flowchart of a sub-processing program of a wrong-way driving detecting direction updating process;

DESCRIPTION OF EMBODIMENTS

Figure 1:
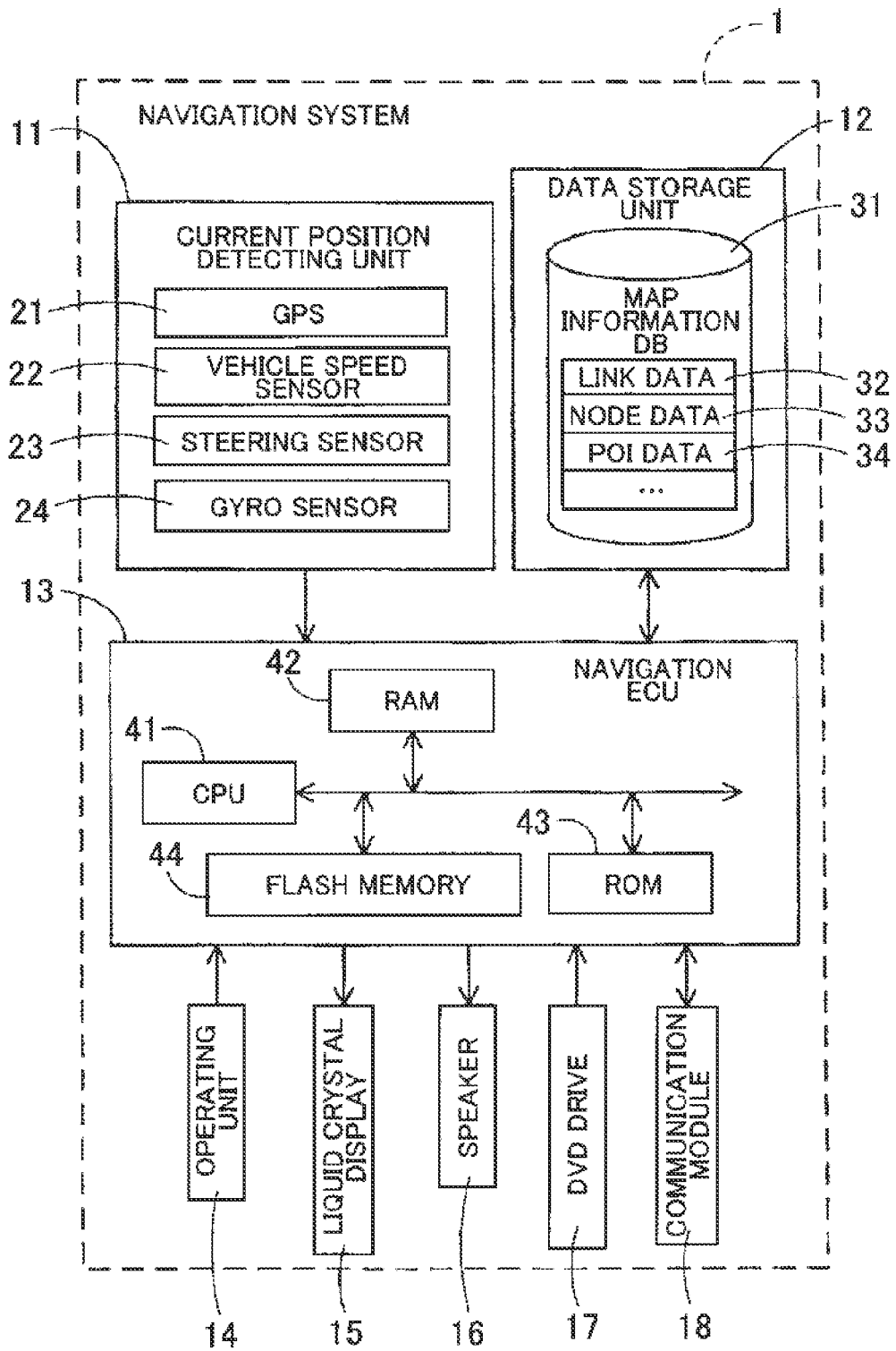
FIG. 1 is a block diagram that shows a navigation system according to an embodiment.

Hereinafter, a navigation system that is a specific embodiment of a driving support system according to the aspects of the invention will be described in detail with reference to the accompanying drawings. First, the schematic configuration of the navigation system 1 according to the present embodiment will be described with reference to FIG. 1. FIG. 1 is a block diagram that shows the navigation system 1 according to the present embodiment.

As shown in FIG. 1, the navigation system 1 is formed of a current position detecting unit 11, a data storage unit 12, a navigation ECU 13, an operating unit 14, a liquid crystal display 15, a speaker 16, a DVD drive 17 and a communication module 18. The current position detecting unit 11 detects the current position of a vehicle. Various pieces of data are recorded in the data storage unit 12. The navigation ECU 13 executes various processings on the basis of input information. The operating unit 14 accepts an operation from a user. The liquid crystal display 15 displays a map and a guidance route to a destination for the user. The speaker 16 outputs audio guidance on route guidance. The DVD drive 17 reads a DVD that serves as a storage medium. The communication module 18 carries out communication with an information center, such as a probe center and a vehicle information and communication system (VICS) (registered trademark in Japan) center.

Hereinafter, components that constitute the navigation system 1 will be described in turn. The current position detecting unit 11 is formed of a GPS 21, a vehicle speed sensor 22, a steering sensor 23, a gyro sensor 24, and the like. The current position detecting unit 11 detects the current position and direction of the vehicle, the running speed of the vehicle, current time, and the like. The vehicle speed sensor 22 is a sensor to detect the travel distance and speed of the vehicle. The vehicle speed sensor 22 generates a vehicle speed pulse at predetermined intervals on the basis of the rotation of drive wheels of the vehicle (for example, generates a vehicle speed pulse per rotation of a quarter way around the drive wheels), and outputs a pulse signal to the navigation ECU 13. Then, the navigation ECU 13 counts generated vehicle speed pulses to calculate the rotation speed of the drive wheels and the travel distance.

When the navigation ECU 13 detects the current position of the vehicle, the navigation ECU 13 carries out the detection not only by the GPS 21 but also by dead reckoning using the vehicle speed sensor 22, the steering sensor 23 and the gyro sensor 24. In the dead reckoning, the travel distance and running direction of the vehicle each are detected by the vehicle speed sensor 22, and the like, and the detected values are accumulated with respect to a reference position to detect the current position of the vehicle. Detecting the current position of the vehicle by the dead reckoning in combination with detecting the current position of the vehicle using the GPS 21 is particularly useful in a place at which it is difficult to receive GPS radio waves, such as a tunnel and a place under the elevated structure. Then, in the navigation system 1 according to the present embodiment, detection using the GPS 21 and detection based on the dead reckoning are combined and used at the time of detecting the current position of the vehicle. Note that it is not necessary for the navigation system 1 to provide all the above sensors of four types; the navigation system 1 may be configured to include only one or multiple-type sensors of them.

The data storage unit 12 includes a hard disk (not shown) and a recording head (not shown). The hard disk serves as an external storage device and a recording medium. The recording head is used to read a map information DB 31, a predetermined program, and the like, recorded in the hard disk and to write predetermined data to the hard disk. Note that the data storage unit 12 may be formed of a memory card or an optical disk, such as a CD and a DVD, instead of the hard disk.

Here, map data including a road network, used for route guidance, traffic information guidance and map display, is recorded in the map information DB 31. In addition, the map data is specifically formed of link data 32 about road (link) shapes, node data 33 about node points, POI data 34 that is information about points of facilities, and the like, intersection data about intersections, search data for searching for a route, retrieval data for retrieving a point, image rendering data for rendering images, such as a map, a road and traffic information, on the liquid crystal display 15, and the like. Information about the road types of links (an automobile expressway, an urban expressway, a freeway, a general toll highway, a national highway, an ordinary road, a minor street, and the like), information about limitations on a running direction, such as one-way traffic, information about road shapes, such as a curve section, and the like, are also stored as the link data 32. Note that the map information DB 31 is updated on the basis of update data distributed from a map distribution center, or the like, or update data provided via a storage medium (for example, a DVD or a memory card).

On the other hand, the navigation ECU 13 is an electronic control unit that comprehensively controls the navigation system 1. The navigation ECU 13 includes a CPU 41 and an internal memory device, such as a RAM 42, a ROM 43 and a flash memory 44. The CPU 41 serves as a processing device and a control device. The RAM 42 is used as a working memory when the CPU 41 executes various processings, and stores route data, or the like, when a route has been found. Not only control programs but also a wrong-way driving detection processing program (see FIG. 2 and FIG. 4) (described later), and the like, are recorded in the ROM 43. The flash memory 44 stores a program loaded from the ROM 43. Note that the navigation ECU 13 functions as various units, as processing algorithms. For example, a route search unit searches for a guidance route from a starting point (for example, the current position of a host vehicle) to a destination. A vehicle speed pulse acquisition unit acquires a vehicle speed pulse that is output at predetermined intervals from the vehicle speed sensor 22 as the vehicle runs. A vehicle position detecting unit may detect the position of the vehicle on the basis of the vehicle speed pulse acquired by the vehicle speed pulse acquisition unit, the GPS 21, the steering sensor 23, the gyro sensor 24, and the like. A vehicle direction detecting unit may detect the direction of the vehicle. A running direction acquisition unit may acquire a normal running direction on the basis of the position of the vehicle, detected by the vehicle position detecting unit. The normal running direction is a running direction specified for a road on which the vehicle runs. A wrong-way driving detecting unit may detect whether the vehicle is placed in a wrong-way driving situation where the vehicle runs a wrong way on the road, on the basis of the direction of the vehicle detected by the vehicle direction detecting unit and the normal running direction, in a state where a vehicle speed pulse is acquired by the vehicle speed pulse acquisition unit at predetermined intervals. A road shape acquisition unit may acquire the road shape of a road ahead of the vehicle in the travelling direction.

The operating unit 14 is operated by the user, for example, when a starting point that is a running start point and a destination that is a running end point are input. The operating unit 14 is formed of a plurality of operation switches (not shown), such as various keys, buttons, and the like. Then, the navigation ECU 13 executes control for carrying out various corresponding operations on the basis of switch signals output by pressing the switches, or the like. Note that the operating unit 14 may be formed of a touch panel that is provided on the front surface of the liquid crystal display 15. In addition, the operating unit 14 may be formed of a microphone and a voice recognition device.

The liquid crystal display 15 displays a map image including roads, a host vehicle mark that indicates the current position of the vehicle on the map image, traffic information, an operation guidance, an operation menu, a key guidance, a guidance route from a starting point to a destination, guidance information along the guidance route, news, a weather forecast, time, a mail, a TV program, and the like. In addition, when it is determined that the vehicle is placed in a wrong-way driving situation where the vehicle runs a wrong way on the road, the liquid crystal display 15 displays a message, or the like, that notifies or warns that the vehicle is placed in a wrong-way driving situation.

The speaker 16 outputs voice guidance that guides running along a guidance route or guidance on traffic information on the basis of instructions from the navigation ECU 13. In addition, when it has been detected that the vehicle is placed in a wrong-way driving situation, the speaker 16 outputs voice, or the like, that notifies or warns that the vehicle is placed in a wrong-way driving situation.

The DVD drive 17 is able to read data recorded in a storage medium, such as a DVD and a CD. Then, for example, music or video is reproduced or the map information DB 31 is updated on the basis of the read data.

The communication module 18 is a communication device for receiving traffic information formed of various pieces of information, such as traffic congestion information, regulatory information and traffic accident information, transmitted from a traffic information center, such as a VICS center and a probe center. For example, a cellular phone and a DCM serve as the communication module 18.

Figure 2:
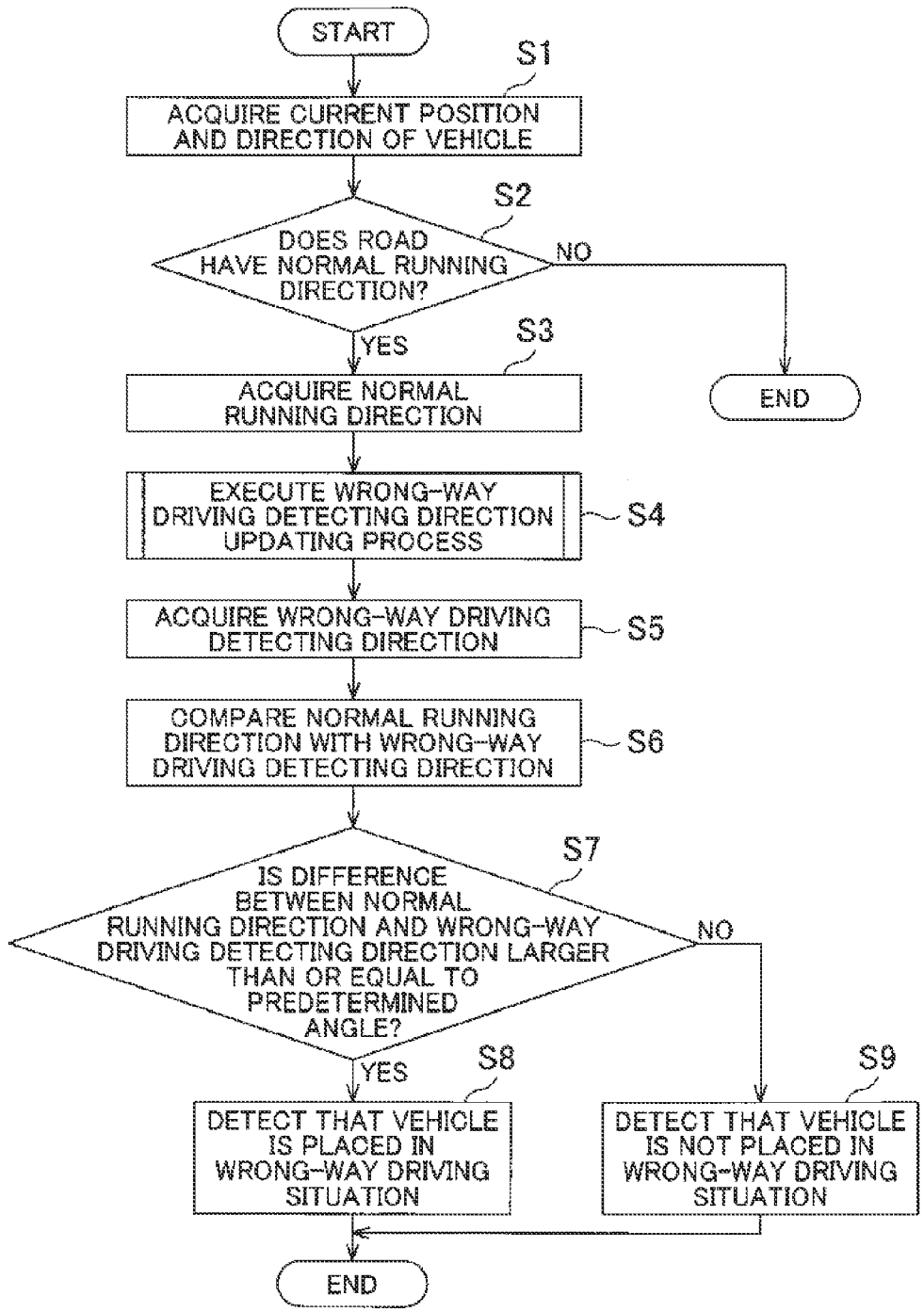
FIG. 2 is a flowchart of a wrong-way driving detection processing program according to the embodiment.

Subsequently, the wrong-way driving detection processing program executed by the thus configured navigation system 1 will be described with reference to FIG. 2. FIG. 2 is a flowchart of the wrong-way driving detection processing program according to the present embodiment. Here, the wrong-way driving detection processing program is executed after the ACC of the vehicle is turned on, and has the function of detecting whether the vehicle is placed in a wrong-way driving situation on the basis of the direction of the vehicle, the running direction specified for a road, and the like. Note that the following program shown by the flowcharts in FIG. 2 and FIG. 4 is stored in the RAM 42, the ROM 43, or the like, of the navigation ECU 13, and is executed by the CPU 41.

In the wrong-way driving detection processing program, first, in step (hereinafter, abbreviated as "S") 1, the CPU 41 uses various sensors equipped for the vehicle, such as the GPS 21, the vehicle speed sensor 22, the steering sensor 23 and the gyro sensor 24, to detect the current position and direction of the vehicle. Note that the current position of the vehicle is detected not only by the GPS 21 but also by dead reckoning using the vehicle speed sensor 22, the steering sensor 23 and the gyro sensor 24 as described above. In addition, in S1, the CPU 41 also executes matching process for matching the current position of the vehicle, detected by the GPS 21 or dead reckoning (hereinafter, referred to as detected position), with a road on the map on the basis of the detected position and the map information acquired from the map information DB 31. As a result, the detected position is corrected, and the current position of the vehicle on a road (hereinafter, referred to as corrected position) is newly detected.

Subsequently, in S2, the CPU 41 determines whether the road on which the vehicle runs is a road having a normal running direction on the basis of the current position of the vehicle, detected in S1. The road on which the vehicle runs is a link that includes the detected position of the vehicle, corrected in the matching process executed in S1 (corrected position). Thus, the CPU 41 acquires the link data 32 of the link that includes the corrected position from the map information DB 31, and determines whether the road has a normal running direction on the basis of the acquired link data of the link. A road having a normal running direction is not only an ordinary road having a narrow road width but also part of roads, on which high-speed running is allowed, such as an automobile expressway, an urban expressway, a freeway, a general toll highway and a national highway.

Then, when it is determined that the road on which the vehicle runs is a road having a normal running direction (YES in S2), the process proceeds to S3. On the other hand, when it is determined that the road on which the vehicle runs is not a road having a normal running direction (NO in S2), the wrong-way driving detection processing program is ended without detecting a wrong-way driving situation.

In S3, the CPU 41 acquires the normal running direction that is the running direction specified for the road on which the vehicle runs. Specifically, the CPU 41 acquires the running direction specified for the link that includes the current position of the vehicle (corrected position) detected in S1 as the normal running direction. When the link has a curved shape, the running direction at the corrected position is acquired as the normal running direction.

Subsequently, in S4, the CPU 41 executes wrong-way driving detecting direction updating process (FIG. 4) described later. The wrong-way driving detecting direction updating process updates a wrong-way driving detecting direction, which is compared with the normal running direction in S6 (described later), with the current direction of the vehicle, detected in S1, when a certain condition is satisfied.

After that, in S5, the CPU 41 acquires the wrong-way driving detecting direction. The wrong-way driving detecting direction is used in S6 (described later) and is compared with the normal running direction to detect whether the vehicle is placed in a wrong-way driving situation, and is stored in the memory, such as the RAM 42. In addition, in S4, when a certain condition is satisfied, the wrong-way driving detecting direction is updated with the current direction of the vehicle, detected in S1. Thus, the wrong-way driving detecting direction basically corresponds to the current direction of the vehicle. However, as will be described later, in a situation that a curve section is present ahead of the vehicle in the travelling direction and a vehicle speed pulse is not acquired, the wrong-way driving detecting direction may be different from the current direction of the vehicle. The detailed description will be made later.

Subsequently, in S6, the CPU 41 compares the normal running direction acquired in S3 with the wrong-way driving detecting direction acquired in S5.

Then, in S7, the CPU 41 determines whether the difference between the normal running direction and the wrong-way driving detecting direction is larger than or equal to a predetermined angle (for example, 135 degrees) on the basis of the result of comparison in S6. Hereinafter, the determination process of S6 will be described in detail with reference to FIG. 3.

Figure 3:
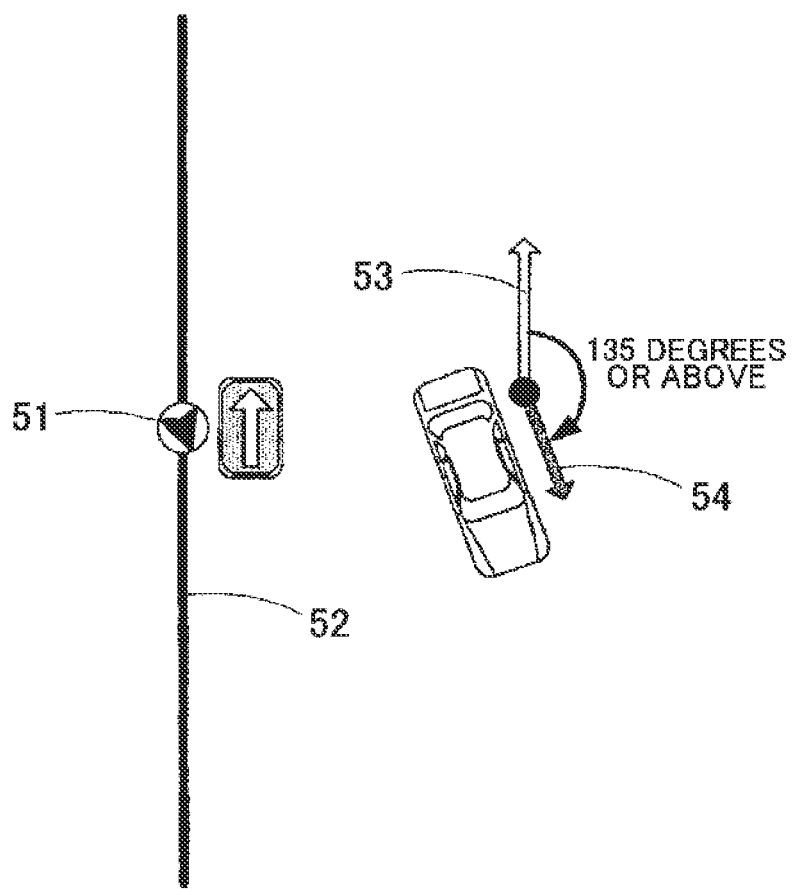
FIG. 3 is a view that illustrates a mode in which a wrong-way driving situation of a vehicle is detected.

As shown in FIG. 3, when a vehicle 51 runs on a link 52, the running direction (direction indicated by the arrow 53) specified for the link 52 is acquired as a normal running direction (S3). On the other hand, basically the current direction (direction indicated by the arrow 54 in FIG. 3) of the vehicle 51 is acquired as a wrong-way driving detecting direction (S5). However, as will be described later, in a situation that a curve section is present ahead of the vehicle 51 in the travelling direction and a vehicle speed pulse is not acquired, a direction different from the current direction of the vehicle 51 may be acquired as a wrong-way driving detecting direction. Then, in S7, the CPU 41 compares the normal running direction (direction indicated by the arrow 53 in FIG. 3) with the wrong-way driving detecting direction (direction indicated by the arrow 54 in FIG. 3), and determines whether the difference between the normal running direction and the wrong-way driving detecting direction is larger than or equal to the predetermined angle (for example, 135 degrees). Here, when it is determined that the difference between the normal running direction and the wrong-way driving detecting direction is larger than or equal to the predetermined angle, it has been detected that the vehicle is placed in a wrong-way driving situation where the vehicle runs in a direction opposite to the running direction specified for the road. In addition, it may be determined in S7 whether the vehicle has run a predetermined distance (for example, 50 m) or longer, or whether the vehicle has run for a predetermined period of time (for example, 10 sec) or longer in a state where the difference between the normal running direction and the wrong-way driving detecting direction is larger than or equal to the predetermined angle (for example, 135 degrees). In this case, it is desirable that, when it is determined that the vehicle has run the predetermined distance or longer, or the vehicle has run for the predetermined period of time or longer in a state where the difference between the normal running direction and the wrong-way driving detecting direction is larger than or equal to the predetermined angle, it is detected that the vehicle is placed in a wrong-way driving situation.

Then, when it is determined that the difference between the normal running direction and the wrong-way driving detecting direction is larger than or equal to the predetermined angle (YES in S7), the process proceeds to S8. In contrast to this, when it is determined that the difference between the normal running direction and the wrong-way driving detecting direction is not larger than or equal to the predetermined angle (that is, when it is determined that the different between the normal running direction and the wrong-way driving detecting direction is smaller than the predetermined angle) (NO in S7), the process proceeds to S9.

In S8, the CPU 41 determines that the vehicle is running in a direction opposite to the running direction specified for the road, and detects that the vehicle is placed in a wrong-way driving situation. On the other hand, in S9, the CPU 41 determines that the vehicle is not running in a direction opposite to the running direction specified for the road, and detects that the vehicle is not placed in a wrong-way driving situation. Then, when the CPU 41 has detected that the vehicle is placed in a wrong-way driving situation, the CPU 41 outputs a message or voice that notifies or warns that the vehicle is placed in a wrong-way driving situation from the liquid crystal display 15 or the speaker 16. Specifically, a message that "currently, running a wrong way on the road, so be careful" is displayed on the liquid crystal display 15 or a voice of the same information is output from the speaker 16. By so doing, the CPU 41 notifies or warns the user that the vehicle is placed in a wrong-way driving situation. In addition, it may be configured to stop wrong-way driving by controlling the vehicle.

Next, the sub-process of the wrong-way driving detecting direction updating process of S4 will be described with reference to FIG. 4. FIG. 4 is a flowchart of the sub-processing program of the wrong-way driving detecting direction updating process.

First, in S11, the CPU 41 acquires the road shape of a road ahead of the vehicle in the travelling direction. Specifically, the CPU 41 initially identifies links that are located within a predetermined distance (for example, within 500 m) ahead of the vehicle in the traveling direction from the link that includes the current position of the vehicle (corrected position) detected in S1. Subsequently, the CPU 41 acquires the link data 32 of the identified links from the map information DB 31, and identifies the road shape of the road ahead of the vehicle in the travelling direction on the basis of the acquired link data.

Subsequently, in S12, the CPU 41 determines whether there is a curve section within the predetermined distance (for example, within 500 m) ahead of the vehicle in the travelling direction on the basis of the road shape of the road ahead of the vehicle in the travelling direction, acquired in S11.

Then, when it is determined that there is a curve section within the predetermined distance ahead of the vehicle in the travelling direction (YES in S12), it is estimated to be in a situation that there is a possibility that it is erroneously detected that the vehicle is placed in a wrong-way driving situation when a vehicle speed pulse is not acquired, and the process proceeds to S14. In contrast to this, when it is determined that there is no curve section within the predetermined distance ahead of the vehicle in the travelling direction (NO in S12), it is estimated to be in a situation that there is no possibility that it is erroneously detected that the vehicle is placed in a wrong-way driving situation even when a vehicle speed pulse is not acquired, and the process proceeds to S13.

In S13, the CPU 41 loads the wrong-way driving detecting direction stored in the memory, such as the RAM 42, and updates the wrong-way driving detecting direction on the basis of the current direction of the vehicle, detected in S1. Specifically, the CPU 41 updates the wrong-way driving detecting direction with the current direction of the vehicle. The wrong-way driving detecting direction is used in S6 (described above) and is compared with the normal running direction to detect whether the vehicle is placed in a wrong-way driving situation. After that, the wrong-way driving detecting direction updating process is ended, and the process proceeds to S5. As a result, in S5 to S9 that are executed thereafter, when the difference between the running direction specified for the road on which the vehicle runs and the detected current direction of the vehicle is larger than or equal to the predetermined angle, it has been detected that the vehicle is placed in a wrong-way driving situation (see FIG. 2 and FIG. 3).

On the other hand, in S14, the CPU 41 determines whether a vehicle speed pulse output from the vehicle speed sensor 22 is acquired within the last predetermined period of time (for example, within the last ten seconds). Note that a vehicle speed pulse is output from the vehicle speed sensor 22 with the rotation of the drive wheels (for example, per rotation of a quarter way around the drive wheels).

Then, when it is determined that a vehicle speed pulse output from the vehicle speed sensor 22 is not acquired within the last predetermined period of time (NO in S14), the wrong-way driving detecting direction updating process is ended without updating the wrong-way driving detecting direction stored in the memory, such as the RAM 42, and the process proceeds to S5. Specifically, the wrong-way driving detecting direction is not updated with the current direction of the vehicle. As a result, in S5 to S9 that are executed thereafter, it is not detected whether the vehicle is placed in a wrong-way driving situation on the basis of the detected current direction of the vehicle. That is, even when the difference between the running direction specified for the road on which the vehicle runs and the detected current direction of the vehicle is larger than or equal to the predetermined angle, it is not always detected that the vehicle is placed in a wrong-way driving situation.

A situation that a vehicle speed pulse output from the vehicle speed sensor 22 is not acquired may be not only the case where the vehicle is stopped but also the case where the vehicle is placed in a state where a vehicle speed pulse is not acquired because of some cause (occurrence of an error or a user's intentional operation) although the vehicle is running. Then, in the case where the vehicle is placed in a state where a vehicle speed pulse is not acquired because of some cause although the vehicle is running, when the wrong-way driving detecting direction is updated with the current direction of the vehicle as in the case of S13 (that is, it is detected whether the vehicle is placed in a wrong-way driving situation on the basis of the detected current direction of the vehicle), it may be erroneously detected that the vehicle is placed in a wrong-way driving situation in S5 to S9 that are executed thereafter although the vehicle is not placed in a wrong-way driving situation. Then, the navigation system 1 according to the present embodiment is configured such that, when it is determined that a vehicle speed pulse output from the vehicle speed sensor 22 is not acquired within the last predetermined period of time (NO in S14), the wrong-way driving detecting direction is not updated (that is, it is not detected whether the vehicle is placed in a wrong-way driving situation on the basis of the detected current direction of the vehicle) to thereby suppress erroneous detection that the vehicle is placed in a wrong-way driving situation. Hereinafter, the above configuration will be described in detail with reference to specific examples shown in FIG. 5A to FIG. 5D.

Figure 5A:
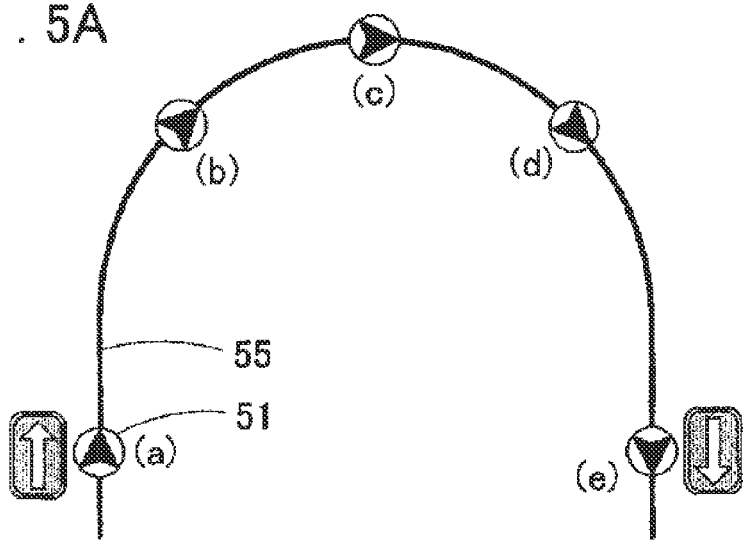
FIG. 5A to FIG. 5D are views that illustrate a mode in which a wrong-way driving situation is detected on the basis of whether a vehicle speed pulse is acquired.
Figure 5B:
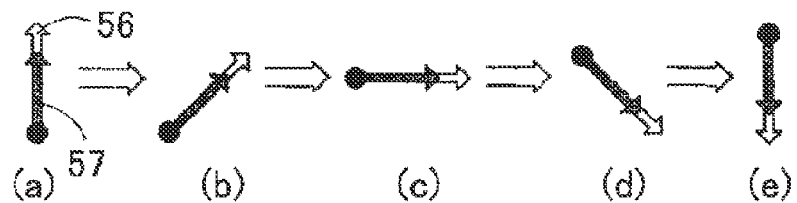
Figure 5C:
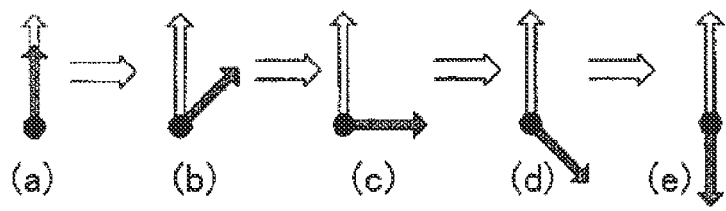
Figure 5D:
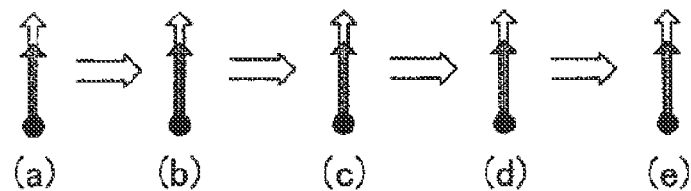

In FIG. 5A to FIG. 5D, the case where a vehicle 51 runs on a road 55 that includes a curve section as shown in FIG. 5A will be described. FIG. 5B to FIG. 5D are views that respectively compare normal running directions 56 with wrong-way driving detecting directions 57 at points (a) to (e) of the road 55. When the vehicle 51 is placed in a state where a vehicle speed pulse is normally acquired at predetermined intervals, the normal running direction 56 specified for the road 55 is constantly substantially the same as the wrong-way driving detecting direction 57 as shown in FIG. 5B irrespective of the current position of the vehicle, so there is no possibility that it is erroneously detected that the vehicle 51 is placed in a wrong-way driving situation.

However, when the vehicle 51 is placed in a state where a vehicle speed pulse is not normally acquired because of some cause, only the detected current direction of the vehicle varies in a state where the detected current position of the vehicle is fixed, so, as shown in FIG. 5C, the wrong-way driving detecting direction 57 varies with the current direction in a state where the normal running direction 56 is fixed. As a result, the difference between the normal running direction 56 and the wrong-way driving detecting direction 57 gradually increases as the vehicle runs, and, finally, it is erroneously detected that the vehicle 51 is placed in a wrong-way driving situation.

Then, the wrong-way driving detecting direction is not updated in a state where the vehicle 51 does not acquire a vehicle speed pulse to thereby fix the wrong-way driving detecting direction 57 together with the normal running direction 56. As a result, as shown in FIG. 5D, the normal running direction 56 is constantly substantially the same as the wrong-way driving detecting direction 57 irrespective of the current position of the vehicle, so there is no possibility that it is erroneously detected that the vehicle 51 is placed in a wrong-way driving situation. Even when the wrong-way driving detecting direction 57 is not updated, the host vehicle position mark displayed on the liquid crystal display 15 is desirably updated so as to indicate the current direction of the vehicle.

On the other hand, when it is determined in S14 that a vehicle speed pulse output from the vehicle speed sensor 22 is acquired within the last predetermined period of time (YES in S14), the process proceeds to S15.

In S15, the CPU 41 determines whether a previous vehicle speed pulse has been acquired within the last predetermined period of time before the current vehicle speed pulse is acquired.

Then, when it is determined that the previous vehicle speed pulse has been acquired within the last predetermined period of time before the current vehicle speed pulse is acquired (YES in S15), it is estimated that a vehicle speed pulse is normally acquired at predetermined intervals, and the process proceeds to S13. In S13, the CPU 41 loads the wrong-way driving detecting direction stored in the memory, such as the RAM 42, as described above, and updates the wrong-way driving detecting direction with the current direction of the vehicle, detected in S1. After that, it is detected whether the vehicle is placed in a wrong-way driving situation on the basis of the running direction specified for the road on which the vehicle runs and the detected current direction of the vehicle (S5 to S9).

On the other hand, when it is determined that no previous vehicle speed pulse has been acquired within the last predetermined period of time before the current vehicle speed pulse is acquired (NO in S15), it is estimated that the vehicle returns from a state where a vehicle speed pulse is not acquired to a state where a vehicle speed pulse is normally acquired, and the process proceeds to S16.

In S16, the CPU 41 loads the wrong-way driving detecting direction stored in the memory, such as the RAM 42, and updates the wrong-way driving detecting direction on the basis of the current direction of the vehicle, detected in S1. Specifically, the wrong-way driving detecting direction is updated with the current direction of the vehicle.

Subsequently, in S17, the CPU 41 uses various sensors equipped for the vehicle, such as the GPS 21, the vehicle speed sensor 22, the steering sensor 23 and the gyro sensor 24, to detect the current position and direction of the vehicle. Note that the process of S17 is the same as that of S1, so the detailed description is omitted.

Subsequently, in S18, the CPU 41 newly acquires the normal running direction that is the running direction specified for the road on which the vehicle runs. Specifically, the CPU 41 acquires the running direction specified for the link that includes the current position of the vehicle (corrected position) detected in S17 as the normal running direction. Note that, when the link has a curved shape, the running direction at the corrected position is acquired as the normal running direction. After that, the wrong-way driving detecting direction updating process is ended, and the process proceeds to S5. As a result, immediately after returning to a state where a vehicle speed pulse is acquired, it is possible to suppress erroneous detection that the vehicle is placed in a wrong-way driving situation. Hereinafter, the above configuration will be described in detail with reference to specific examples shown in FIG. 6A to FIG. 6C.

Figure 6A:
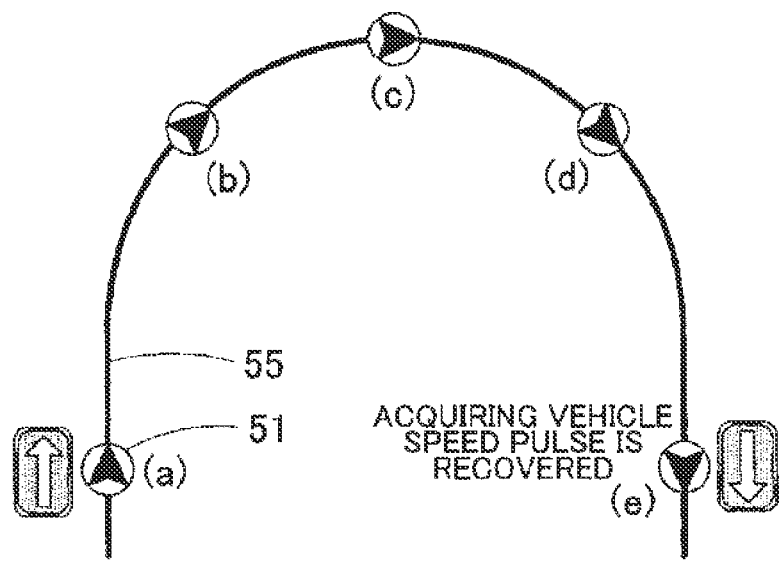
FIG. 6A to FIG. 6C are views that illustrate a mode in which a wrong-way driving situation is detected at the time when acquiring a vehicle speed pulse is recovered.
Figure 6B:
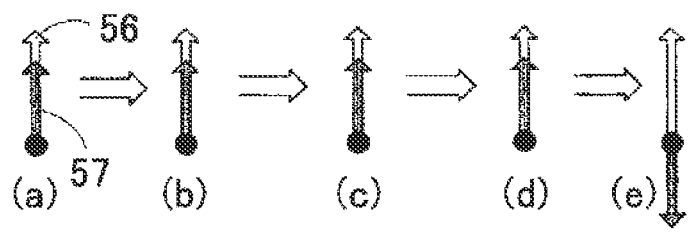
Figure 6C:
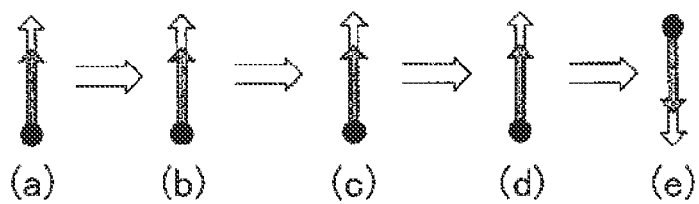
Figure 7A:
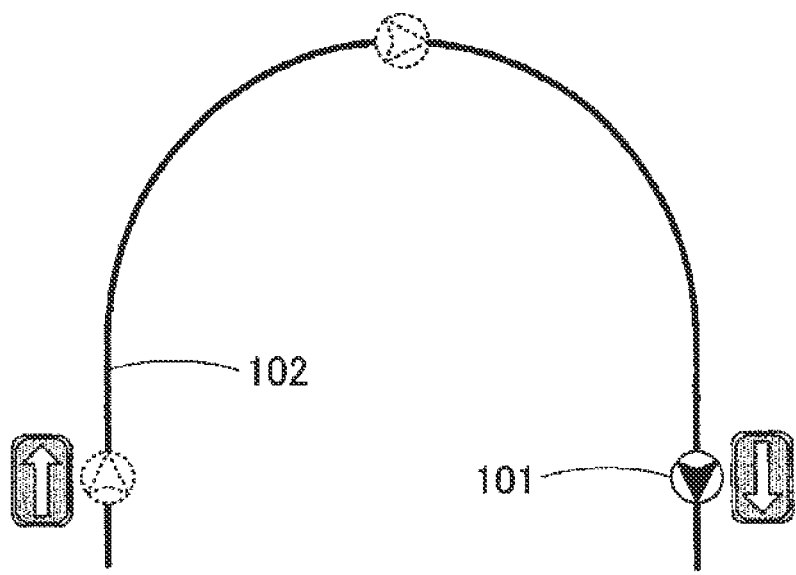
FIG. 7A and FIG. 7B are views that illustrate a problem of the related art.
Figure 7B:
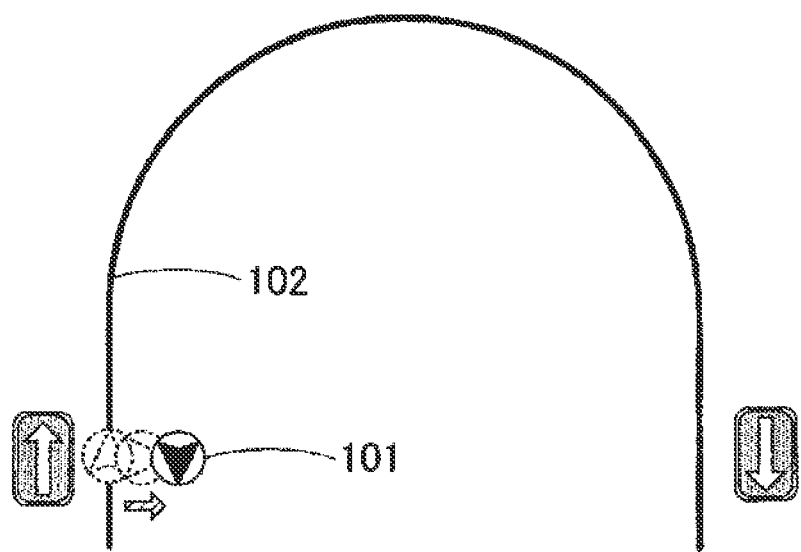

In FIG. 6A to FIG. 6C, the case where, as shown in FIG. 6A, the vehicle 51 runs on a road 55 that includes a curve section, a vehicle speed pulse is not acquired in the section between the point (a) to the point (d) and a vehicle speed pulse is acquired at the point (e) will be described. FIG. 6B and FIG. 6C are views that compare normal running directions 56 with wrong-way driving detecting directions 57 at the points (a) to (e) of the road 55. As described above, in the section between the point (a) and the point (d) in which a vehicle speed pulse is not acquired, the wrong-way driving detecting direction is not updated to thereby fix the wrong-way driving detecting direction 57 together with the normal running direction 56. As a result, in the section between the point (a) and the point (d), irrespective of the current position of the vehicle, the normal running direction 56 is constantly substantially the same as the wrong-way driving detecting direction 57, so there is no possibility that it is erroneously detected that the vehicle 51 is placed in a wrong-way driving situation. However, when the normal running direction 56 is not newly acquired at the time when a vehicle speed pulse is acquired at the point (e), the wrong-way driving detecting direction 57 significantly varies with the current direction in a state where the normal running direction 56 is fixed at the point (e), as shown in FIG. 6B. As a result, the difference between the normal running direction 56 and the wrong-way driving detecting direction 57 is large at the point (e), and it is erroneously detected that the vehicle 51 is placed in a wrong-way driving situation.

Then, when the normal running direction 56 is newly acquired before comparing the normal running direction 56 with the wrong-way driving detecting direction 57 at the time when a vehicle speed pulse is acquired at the point (e), the normal running direction 56 is updated on the basis of the current position of the vehicle when the wrong-way driving detecting direction 57 significantly varies with the current direction at the point (e), as shown in FIG. 6C. As a result, even immediately after acquiring a vehicle speed pulse is recovered, the normal running direction 56 is substantially the same as the wrong-way driving detecting direction 57, so there is no possibility that it is erroneously detected that the vehicle 51 is placed in a wrong-way driving situation.

As described in detail above, with the navigation system 1 according to the present embodiment, the driving support method using the navigation system 1, and the computer program executed in the navigation system 1, various sensors, such as the GPS 21 and the vehicle speed sensor 22, are used to detect the current position and direction of the vehicle (S1), the normal running direction that is the running direction specified for the road on which the vehicle runs is acquired (S3), and, in a state where a vehicle speed pulse is acquired at the predetermined intervals, it is detected whether the vehicle is placed in a wrong-way driving situation on the basis of the detected current direction of the vehicle and the normal running direction; whereas, in a state where a vehicle speed pulse is not acquired, it is not detected whether the vehicle is placed in a wrong-way driving situation on the basis of the detected current direction of the vehicle (S5 to S9), so it is possible to suppress erroneous detection that the vehicle is placed in a wrong-way driving situation although the vehicle is actually running in accordance with the running direction specified for the road. As a result, it is possible to further accurately recognize that the vehicle is placed in a wrong-way driving situation. In addition, it is possible to appropriately stop wrong-way driving by notifying or warning the driver, or by controlling the vehicle, for example. In addition, when it is detected whether the vehicle is placed in a wrong-way driving situation, the wrong-way driving detecting direction is compared with the normal running direction, and, when the difference between the wrong-way driving detecting direction and the normal running direction is larger than or equal to the predetermined angle, it is detected that the vehicle is placed in a wrong-way driving situation (S5 to S9). Then, the wrong-way driving detecting direction is updated with the current direction of the vehicle when a vehicle speed pulse is acquired at the predetermined intervals; whereas the wrong-way driving detecting direction is not updated when a vehicle speed pulse is not acquired at the predetermined intervals (S13 and S14). Thus, only in a state where a vehicle speed pulse is acquired at the predetermined intervals, the running direction specified for the road on which the vehicle runs is compared with the detected current direction of the vehicle to thereby make it possible to further accurately detect whether the vehicle is placed in a wrong-way driving situation where the vehicle runs a wrong way on the road. On the other hand, in a state where a vehicle speed pulse is not acquired because of some cause, even when the difference between the detected current direction of the vehicle and the running direction specified for the road on which the vehicle runs is significantly large, there is no possibility that it is erroneously detected that the vehicle is placed in a wrong-way driving situation. Thus, it is possible to suppress erroneous detection that the vehicle is placed in a wrong-way driving situation. In addition, even when the current vehicle speed pulse is acquired, when the previous vehicle speed pulse has not been acquired within the predetermined period of time before the current vehicle speed pulse is acquired, the normal running direction is updated (S18), so it is possible to suppress erroneous detection that the vehicle is placed in a wrong-way driving situation immediately after returning to a state where a vehicle speed pulse is acquired. In addition, when there is no curve section ahead of the vehicle in the travelling direction, it is constantly detected whether the vehicle is placed in a wrong-way driving situation on the basis of the detected current direction of the vehicle (S5 to S9) irrespective of whether a vehicle speed pulse is acquired; whereas, when there is a curve section ahead of the vehicle in the travelling direction, it is detected whether the vehicle is placed in a wrong-way driving situation on the basis of the detected current direction of the vehicle only in a state where a vehicle speed pulse is acquired at the predetermined intervals. Thus, only in a situation that there is no possibility that it is erroneously detected that the vehicle is placed in a wrong-way driving situation, it is possible to appropriately detect a wrong-way driving situation using the current direction of the vehicle.

Note that the aspects of the invention are not limited to the above embodiment; of course, the aspects of the invention may be modified or improved in various forms without departing from the scope of the invention. For example, the present embodiment is configured such that the wrong-way driving detecting direction is not updated in a state where there is a curve section ahead of the vehicle in the travelling direction and a vehicle speed pulse is not acquired to thereby not to erroneously detect a wrong-way driving situation; instead, it may be configured such that the wrong-way driving detection process itself (for example, processes corresponding to S5 to S9) is not executed in a state where there is a curve section ahead of the vehicle in the travelling direction and a vehicle speed pulse is not acquired. Even with the above configuration, it is possible to suppress erroneous detection of a wrong-way driving situation.

In addition, in a state where there is a curve section ahead of the vehicle in the travelling direction and a vehicle speed pulse is not acquired, the detecting condition for detecting a wrong-way driving situation may be changed from the detecting condition in a the other state. More specifically, in a state where there is a curve section ahead of the vehicle in the travelling direction and a vehicle speed pulse is not acquired, the detecting condition may be set more strictly than the detecting condition in the other state (for example, the condition of the predetermined angle in S7 is changed to a larger angle) to make it harder to be determined as the wrong-way driving situation. In addition, in a state where there is a curve section ahead of the vehicle in the travelling direction and a vehicle speed pulse is not acquired, it may be configured such that the process of detecting a wrong-way driving situation is executed as usual but the user is not notified or warned even when the wrong-way driving situation has been detected.

In addition, the aspects of the invention may be applied to a system, other than the navigation system, that has the function of identifying the current position and direction of a mobile unit, such as a vehicle. For example, the aspects of the invention may be applied to a mobile terminal, such as a cellular phone and a PDA, a personal computer, or the like. In addition, the mobile unit that is set as a target for which wrong-way driving is detected may be a two-wheel vehicle.

The invention claimed is:

1. A driving support system characterized by comprising:
 a vehicle speed pulse acquisition unit that acquires a vehicle speed pulse that is output at predetermined intervals as a vehicle runs;
 a vehicle position detecting unit that detects a position of the vehicle on the basis of the vehicle speed pulse acquired by the vehicle speed pulse acquisition unit;
 a vehicle direction detecting unit that detects a direction of the vehicle;
 a running direction acquisition unit that acquires a normal running direction, which is a running direction specified for a road on which the vehicle runs, on the basis of the position of the vehicle detected by the vehicle position detecting unit; and
 a wrong-way driving detecting unit that detects whether the vehicle is placed in a wrong-way driving situation where the vehicle runs a wrong way on the road, on the basis of the direction of the vehicle detected by the vehicle direction detecting unit and the normal running direction, in a state where the vehicle speed pulse is acquired by the vehicle speed pulse acquisition unit at the predetermined intervals, wherein
 the wrong-way driving detecting unit compares a wrong-way driving detecting direction with the normal running direction to determine whether a difference between the wrong-way driving detecting direction and the normal running direction is larger than or equal to a predetermined angle and, when the wrong-way driving detecting, unit determines that the difference between the wrong-way driving detecting direction and the normal running direction is larger than or equal to the predetermined angle. the wrong-way driving detecting unit detects that the vehicle is placed in the wrong-way driving situation:
 when the vehicle speed pulse is acquired by the vehicle speed pulse acquisition unit at the predetermined intervals the wrong-way driving detecting unit updates the wrong-way driving detecting direction with the direction of the vehicle detected by the vehicle direction detecting unit; and
 when the vehicle speed pulse is not acquired by the vehicle speed pulse acquisition unit at the predetermined intervals, the wrong-way driving detecting unit does not update the wrong-way driving detecting direction.

2. The driving support system according to claim 1, wherein
 when the current vehicle speed pulse is acquired by the vehicle speed pulse acquisition unit and the previous vehicle speed pulse has not been acquired by the vehicle speed pulse acquisition unit within a predetermined period of time before the current vehicle speed pulse is acquired, the wrong-way driving detecting unit updates the wrong-way driving detecting direction before comparing the wrong-way driving detecting direction with the normal running direction.

3. The driving support system according to claim 1, further comprising:
 a road shape acquisition unit that acquires a road shape of a road ahead of the vehicle in a travelling direction of the vehicle, wherein
 when there is no curve section ahead of the vehicle in the travelling direction, the wrong-way driving detecting unit detects whether the vehicle is placed in the wrong-way driving situation, on the basis of the direction of the vehicle detected by the vehicle direction detecting unit and the normal running direction, irrespective of whether the vehicle speed pulse is acquired by the vehicle speed pulse acquisition unit at the predetermined intervals, and
 when there is a curve section ahead of the vehicle in the travelling direction, the wrong-way driving detecting unit detects whether the vehicle is placed in the wrong-way driving situation, on the basis of the direction of the vehicle detected by the vehicle direction detecting unit and the normal running direction, in a state where the vehicle speed pulse is acquired by the vehicle speed pulse acquisition unit at the predetermined intervals.

4. The driving support system according to claim 1, wherein
the wrong-way driving detecting unit does not detect whether the vehicle is placed in the wrong-way driving situation where the vehicle runs a wrong way on the road in a state where the vehicle speed pulse is not acquired by the vehicle speed pulse acquisition unit at the predetermined intervals.

5. The driving support system according to claim 1, wherein
in a state where the vehicle speed pulse is not acquired by the vehicle speed pulse acquisition unit at the predetermined intervals, the wrong-way driving detecting unit changes a detecting condition for detecting whether the vehicle is placed in the wrong-way driving situation from the detecting condition in a state where the vehicle speed pulse is acquired by the vehicle speed pulse acquisition unit at the predetermined intervals.

6. A driving support method characterized by comprising:
acquiring a vehicle speed pulse that is output at predetermined intervals as a vehicle runs;
detecting a position of the vehicle on the basis of the acquired vehicle speed pulse;
detecting a direction of the vehicle;
acquiring a normal running direction, which is a running direction specified for a road on which the vehicle runs, on the basis of the detected position of the vehicle; and
detecting whether the vehicle is placed in a wrong-way driving situation where the vehicle runs a wrong way on the road, on the basis of the detected direction of the vehicle and the normal running direction, in a state where the vehicle speed pulse is acquired at the predetermined intervals, wherein
the detecting whether the vehicle is placed in a wrong-way driving situation includes comparing a wrong-way driving detecting direction with the normal running direction to determine whether a difference between the wrong-way driving detecting direction and the normal running direction is larger than or equal to a predetermined angle, and. when it is determined that the difference between the wrong-way driving detecting direction and the normal running direction is larger than or equal to the predetermined angle, it is determined that the vehicle is placed in the wrong-way driving situation;
when the vehicle speed pulse is acquired at the predetermined intervals, a wrong-way driving detecting unit updates the wrong-way driving detecting direction with the direction of the vehicle detected by a vehicle direction detecting unit; and
when the vehicle speed pulse is not acquired at the predetermined intervals, no updating of the wrong-way driving detecting direction is performed.

7. A computer program that is installed on a computer and that causes a processor to perform a driving support function, the driving support function characterized by comprising:
acquiring a vehicle speed pulse that is output at predetermined intervals as a vehicle runs;
detecting a position of the vehicle on the basis of the acquired vehicle speed pulse;
detecting a direction of the vehicle;
acquiring a normal running direction, which is a running direction specified for a road on which the vehicle runs, on the basis of the detected position of the vehicle; and
detecting whether the vehicle is placed in a wrong-way driving situation where the vehicle runs a wrong way on the road, on the basis of the detected direction of the vehicle and the normal running direction, in a state where the vehicle speed pulse is acquired at the predetermined intervals, wherein
the detecting whether the vehicle is placed in a wrong-way driving situation includes comparing a wrong-way driving detecting direction with the normal running direction to determine whether a difference between the wrong-way driving detecting direction and the normal running direction is larger than or equal to a predetermined angle, and, when it is determined that the difference between the wrong-way driving detecting direction and the normal running direction is larger than or equal to the predetermined angle, it is determined that the vehicle is placed in the wrong-way driving situation;
when the vehicle speed pulse is acquired at the predetermined intervals, a wrong-way driving detecting unit updates the wrong-way driving detecting direction with the direction of the vehicle detected by a vehicle direction detecting unit; and
when the vehicle speed pulse is not acquired at the predetermined intervals, no updating of the wrong-way driving detecting direction is performed.

* * * * *